J. M. WAUGH.
TRANSMISSION GEAR.
APPLICATION FILED OCT. 2, 1919.
1,382,697.
Patented June 28, 1921.
2 SHEETS—SHEET 1.
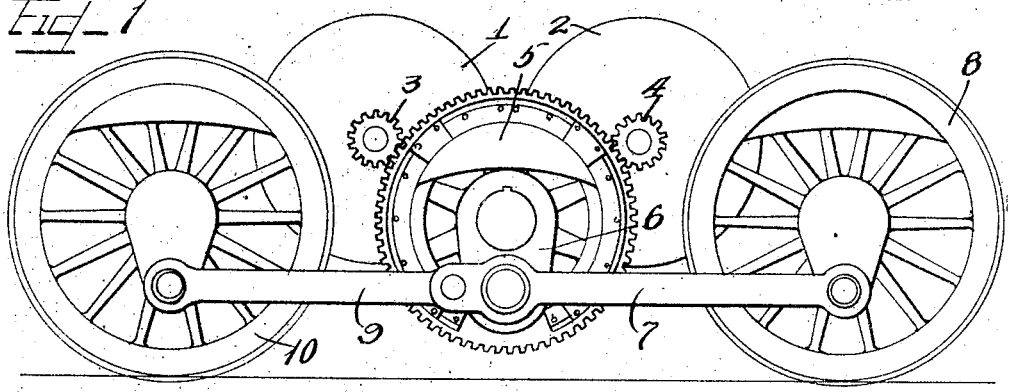
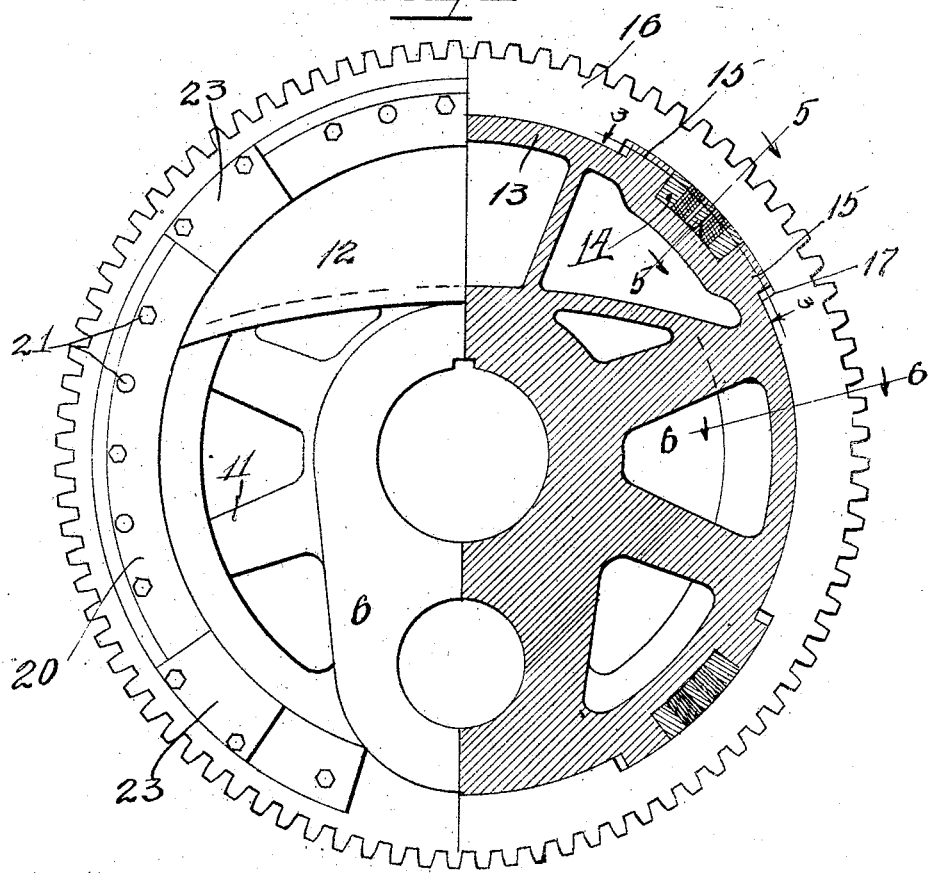

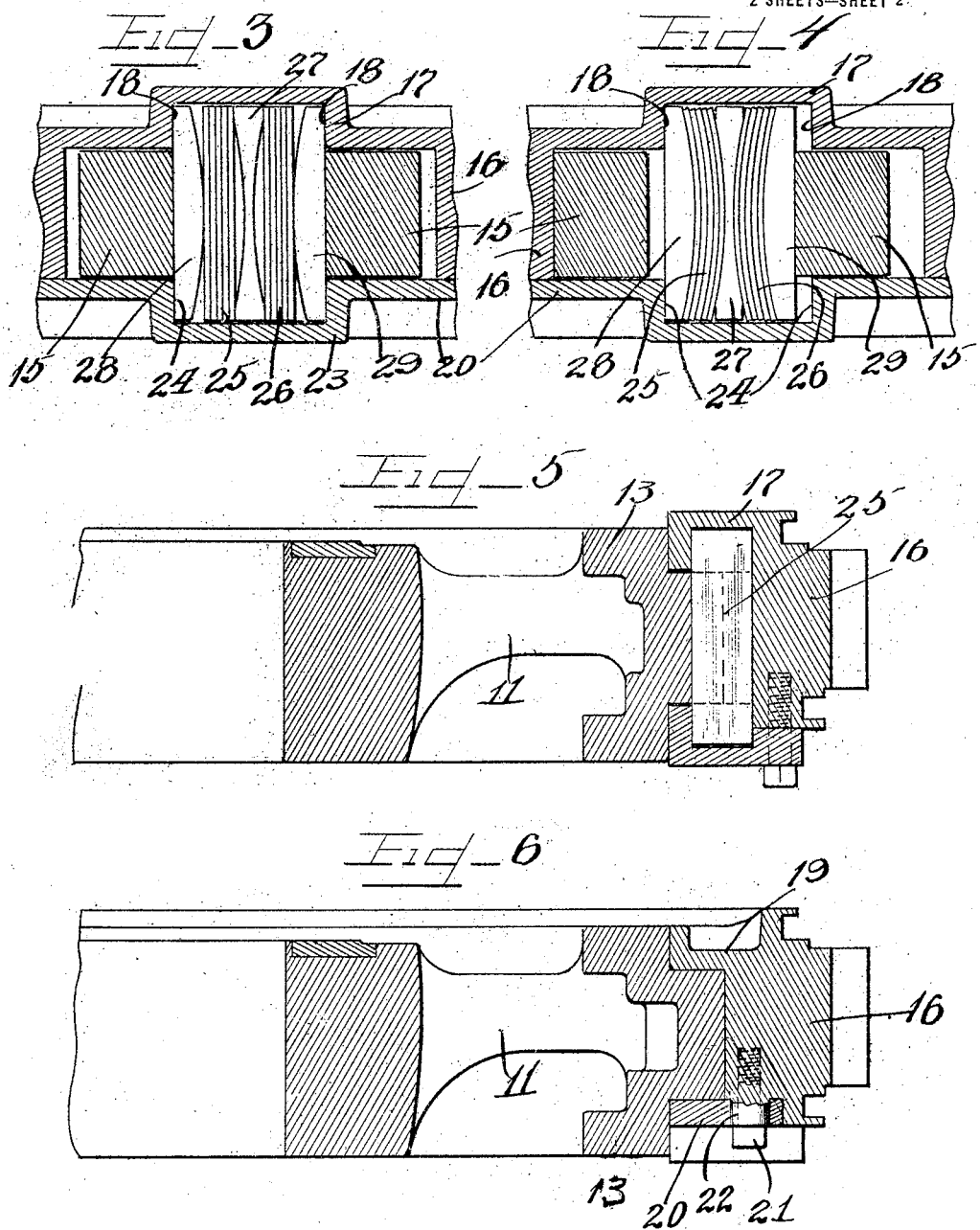

UNITED STATES PATENT OFFICE.

JAMES MILTON WAUGH, OF CHICAGO, ILLINOIS.

TRANSMISSION-GEAR.

1,382,697.　　　　Specification of Letters Patent.　　Patented June 28, 1921.

Application filed October 2, 1919. Serial No. 327,960.

*To all whom it may concern:*

Be it known that I, JAMES MILTON WAUGH, a citizen of the United States, and a resident of the city of Chicago, in the county of Cook and State of Illinois, have invented certain new and useful Improvements in a Transmission-Gear; and I do hereby declare that the following is a full, clear, and exact description of the same, reference being had to the accompanying drawings, and to the numerals of reference marked thereon, which form a part of this specification.

This invention relates to that class of devices shown and described in my co-pending application for resilient transmission gear, filed October 10, 1919, Serial No. 329,709.

The invention contemplates the use of resilient friction-plate mechanisms interposed between the wheel portion and a movable rim thereon, which in their assembled relation constitute a unitary gear element adapted for use as a transmission gear, and owing to its construction serving to absorb load impact stresses and effect a yieldable drive between a driving and a driven element.

It is an object therefore of this invention to construct a resilient type of transmission gear comprising a wheel structure having a rim movably mounted thereon and with said rim and wheel provided with registering pockets and abutment members with groups of resilient friction-plate members disposed therein tending to resist relative movement between said rim and wheel in either direction. It is also an object of this invention to provide a resilient type of transmission gear adapted to apply power yieldably from the source of power to a driven mechanism and acting effectively to absorb load impacts between a driving and a driven mechanism.

Other and further important objects of this invention will be apparent from the disclosures in the drawings and specification.

The invention (in a preferred form) is illustrated in the drawings and hereinafter more fully described.

Drawings.

Figure 1 is a diagrammatical view illustrating an adaptation of a gear embodying the principles of my invention to an electric-locomotive driving mechanism.

Fig. 2 is an elevation partly in section of a wheel embodying the principles of my invention.

Fig. 3 is a detail section on line 3—3 of Fig. 2.

Fig. 4 is a similar view illustrating the parts in an extreme position of adjustment.

Fig. 5 is a detailed section on line 5—5 of Fig. 2.

Fig. 6 is a detailed section on line 6—6 of Fig. 2.

Description.

Referring to Fig. 1, a pair of driving motors are shown conventionally indicated respectively by the reference numerals 1 and 2, and provided with pinions 3 and 4 each of which meshes with a transmission gear embodying the principles of my invention and denoted as a whole by the reference numeral 5. Said transmission gear is provided with an integral crank member 6, and journaled on the crank shaft extension thereof is one end of a connecting rod 7 which is also journaled on the crank shaft of a driver wheel 8. Another connecting rod 9 is journaled on a crank shaft extension of the connecting rod 7 and also upon the crank shaft of a driver wheel 10.

The transmission gear 5 comprises an inner wheel structure 11 which, as shown clearly in Fig. 2, has the crank portion 6 integral therewith. Said inner wheel structure has also formed integrally therewith a counterweight 12 diametrically opposite to the crank extension 6 to balance the same and the connecting rods attached thereon against centrifugal effects. Formed on the rim 13 of said inner wheel 11 are a plurality of pockets 14 in the instance shown, four in number, although the particular number is immaterial and may vary with transmission gears of different designs. Each of the pockets 14 is provided with abutments 15 at its ends and, fitted over said wheel rim 13 and capable of a lost motion rotative effect with respect thereto, is a rim or ring gear 16. Said ring gear 16 is also provided with pockets 17 which are of greater length than the extreme distance of the abutments 15 so as to permit of a lost motion between the ring gear and the wheel 11. Furthermore, as shown clearly in Figs. 3 and 4, said pockets 17 of the ring gear are of greater width at their middle portion thus affording abutments 18 on the interior thereof, in an inwardly directed side flange 19 which extends inwardly over one side surface of the wheel 16 as shown clearly in Fig. 6. On the opposite side of said wheel a ring plate of almost complete circular form and denoted by the reference numeral 20 is bolted to the rim of gear 16 by bolts 21 to hold the ring gear rotatably adjustable on the wheel rim 13.

As shown clearly in Fig. 6, the ring gear 16 is provided with boss or lug extensions 22 which project through apertures in the retaining ring 20, and the attaching bolts 21 extend therethrough, so that any shearing stress between the ring gear 16 and the ring plate 20 is not imposed upon the attaching bolts. As clearly shown in Figs. 2, 3 and 5, said ring plate 20 is provided with enlarged outwardly extending portions 23 registering with the pockets 17 in the ring gear 16. The ends of said enlarged portions 23 of the ring plate 20 afford abutments 24, corresponding to the abutments 18 of the pockets 17.

Disposed in the pockets 14 and inclosed by the pockets 17 and 23 of the ring gear and retaining ring 20 are a plurality of groups of resilient spring friction plates 25 and 26. Disposed therebetween is a doubly concave intermediate abutment plate 27, and end-follower blocks 28 and 29 respectively are provided at the outer ends of the friction plate groups, the surfaces of contact of said follower blocks with the respective friction plates being convex.

*Operation.*

With the parts in the normal position shown in Figs. 2 and 3, the ring gear 16 is disposed with the ends of the pockets 17 thereon equidistantly beyond the outer ends of the abutments 15 of the wheel rim 13, and the resilient friction plates 25 and 26 repose in the unstressed position as in Fig. 3 with the movable follower blocks 28 and 29 respectively bearing against the respective abutments 15 of the wheel rim and abutments 18 and 24 respectively of the ring gear and retaining ring mounted on said wheel. When a drive is imparted to the gear to rotate the ring gear in a clockwise direction referring to Figs. 1 and 2; then, if the parts move to an extreme position, they assume the relation shown in Fig. 4.

When the elements are in this position and the friction plates 25 and 26 are under stress, each of the follower blocks 28 has been moved by the abutments 18 and 24 of the ring gear and ring plate, but the follower blocks 29 are held stationary by the abutments 15 on the wheel. As a consequence, with the friction plates 25 and 26 in an extreme position, a direct transmission of drive from the ring gear 16 to the wheel 11—13 is effected; but in the creation of such driving effect the resilient plates are necessarily stressed first so that the load as received by the driving ring gear is yieldably applied. The resilient friction plates are not always stressed into extreme position as shown in Fig. 4, but the amount of displacement depends upon the load applied and for light loads only amounts to a small movement. In any event, application of the load to the driving ring gear 16 by the wheel 11 cannot take place without a yielding action through the resilient friction plates.

Furthermore, the groups of resilient friction plates have a resilient action which is entirely different from that of ordinary spring mechanisms. That is to say, the resilient friction plates operate also as an absorbing means to absorb shocks of suddenly imparted load or impacts and prevent a resilient oscillation of the ring gear 16 with respect to its wheel 11—13. This is due to the large amount of friction between the surfaces of the friction plates, which acts with the stiffness of the resilient plates in resisting the flexure thereof, and again enters into the operation to prevent sudden recoil of the plates to normal. Loads suddenly applied which are comparable to impacts or shocks exert a greater compressive effect upon the resilient friction plates and not only serve to deflect the same under stress but likewise increase the pressure therebetween and consequently increase the friction which serves to assist the plates in resisting flexure. If it were not for the friction between the plates when the load is suddenly released, the recoil action due to the resiliency of the plates would cause a sudden oscillating movement between the ring gear 16 and its wheel 11—13 and the movement of the parts would probably set up an oscillation continuing for a certain length of time depending on conditions. Of course, this is not desirable where a uniform drive is at all times demanded. The friction between the plates, however, operates to resist the recoil and prevents such an action being set up. The operation of the resilient members is always yieldable, both under the application of load and subsequently under the release of the load.

I am aware that numerous details of construction may be varied through a wide range without departing from the principles of this invention, and I therefore do not purpose limiting the patent granted otherwise than necessitated by the prior art.

Claims:

1. A transmission gear comprising a ring gear, a wheel member mounted therein and provided with pockets, resilient plates disposed transversely in the pockets, follower blocks associated therewith and movable with said plates in said pockets, abutments on the ends of said pockets to resist retractive movements of the follower blocks, and abutments on said ring gear contacting said follower blocks to thrust the same toward one another and stress said resilient members when a drive is transmitted by the transmission gear.

2. A transmission gear of the class described comprising a wheel member, a ring gear having a lost motion connection therewith, transversely disposed resilient friction plate members mounted in said wheel, follower blocks associated therewith and limited from separating movement by said wheel, and abutments on the ring gear to contact the follower blocks and impel the same toward one another during transmission of a drive.

3. A transmission gear comprising a wheel, a rim thereon, pockets formed in the rim, a ring gear rotatably mounted on said rim, abutments on said rim and ring gear to limit the lost motion therebetween, a plurality of groups of friction plates disposed transversely in the pockets of said rim, follower blocks associated therewith normally resting against the abutments formed on said ring gear, said abutments formed on said ring gear contacting said follower blocks and adapted, together with an abutment on the rim, to flex the plates under stress when a drive is transmitted by said gear.

4. A transmission gear of the class described comprising a wheel, a ring gear rotatably associated therewith, an inwardly directed flange on said ring gear fitting against the wheel, groups of resilient friction plates interposed between said wheel and ring gear to effect yieldable driving connection therebetween and a retaining ring plate bolted on said ring gear and overlapping said wheel to hold the ring gear in proper relation on said wheel.

5. A transmission gear of the class described comprising a wheel, a ring gear rotatably associated therewith, inwardly directed means on said ring gear overlapping said wheel on one side thereof, means attachable on said ring gear to overlap the other side of the wheel to retain the ring gear assembled on said wheel, a plurality of groups of resilient members interposed between said wheel and ring gear and inclosed thereby to provide a yieldable driving connection therebetween, and movable abutment members separating the groups of resilient members to permit flexing thereof.

6. In a transmission gear of the class described, a wheel, a ring gear rotatively associated therewith, an inwardly directed flange on said ring gear overlapping said wheel on one side thereof, means attached on the other side of said ring gear overlapping the wheel to hold the ring gear assembled on the wheel, and a plurality of groups of resilient friction plate mechanisms inclosed by and interposed between said ring gear and wheel to provide a yieldable driving connection therebetween.

7. A transmission gear mechanism comprising rotatable concentric members, groups of spring friction plates disposed between said concentric members, and slidable doubly concave abutment members separating the groups of friction spring plates to permit the same to be flexed when a drive is transmitted by the transmission gear mechanism.

8. A transmission gear mechanism comprising rotatable co-axial members, groups of spring friction plates disposed between said co-axial members, slidable concave members separating the groups of spring friction plates, and slidable convex follower blocks disposed at the outer sides of said groups of spring friction plates.

In testimony whereof I have hereunto subscribed my name in the presence of two subscribing witnesses.

JAMES MILTON WAUGH.

Witnesses:
 RIDSDALE ELLIS,
 LE ROY D. KILEY.